Nov. 10, 1936.  A. HERSCH  2,060,416

HUB CAP AND WHEEL LOCK

Filed Feb. 12, 1934

INVENTOR
Alfred Hersch
BY
ATTORNEYS

Patented Nov. 10, 1936

2,060,416

UNITED STATES PATENT OFFICE 2,060,416

HUB CAP AND WHEEL LOCK

Alfred Hersch, Toledo, Ohio

Application February 12, 1934, Serial No. 710,844

1 Claim. (Cl. 70—90)

The present invention pertains to a novel lock for hub caps such as are used on automotive vehicle wheels.

It is common practice to form automobile wheels with large hubs in order to conceal the bolts and nuts by means of which the wheels are secured in place, and the hub opening that provides means of access to the wheel securing bolts and nuts is ordinarily closed by means of a hub cap. The present invention has as its primary object to provide means for locking the hub cap in place so as to prevent unauthorized removal of the same with the result that it is impossible for any unauthorized person to remove the wheel, and thus eliminate theft of hub caps and of wheels. In providing a lock the invention further aims to provide a plurality of retaining members equally spaced around the annular hub, the retaining members being retractible by means of a key actuated mechanism. The plurality of retaining members are desirable inasmuch as the cap is ordinarily formed of sheet metal and in the event that a single retainer is used the hub cap may be removed by a wedge-type lever by prying at a point diametrically opposite to the point where the retainer member engages the hub. However, the use of a plurality of retainer members has heretofore been unpractical because they interfere with the axle spindle which ordinarily extends into the wheel hub. Accordingly it is another object of the present invention to provide a hub cap lock embodying a plurality of retainer members and means for actuating the same which is constructed and arranged so as to not interfere with the axle spindle which projects into the wheel hub and into the hub cap.

With the above and other ends in view the invention consists in matters hereinafter set forth and more particularly pointed out in the appended claim, reference being had to the accompanying drawing, in which—

Like characters of reference are employed throughout to designate corresponding parts.

Figure 1:
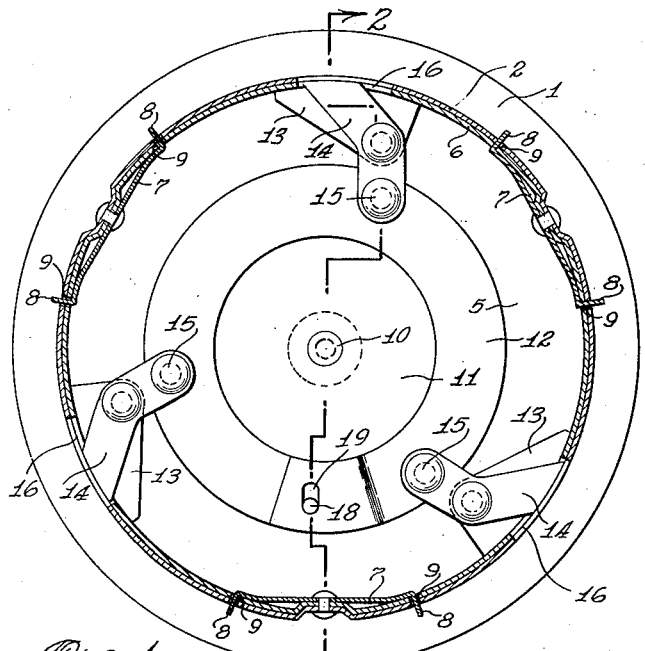
Figure 1 is a cross section taken along the line 1—1 of Fig. 2.

The numeral 1 designates the outer shell of the hub cap which is rounded out to give an ornamental effect and also to provide an additional amount of space to house parts to be described. The hub cap shell 1 is provided with an integral annular rim 2 of a diameter less than the largest diameter of the shell 1. The annular rim 2 is adapted to fit within an opening 3 in a hub 4 of an automobile wheel, the opening 3 and hub 4 being designated in broken lines in Fig. 2 because they form no part of the invention and lend no novelty thereto.

An inner shell 5 is secured within the outer shell 1 and is provided with an annular rim 6 which fits within and is secured to the rim 2, the means of securing preferably being by welding the parts together. In order to retain the annular rim portions 2 and 6 within the hub opening 3 there are provided a plurality of spring fingers 7 having retaining portions 8 extending through apertures 9 in the rims 2 and 6 to engage the hub 4.

Prior to securing the inner shell 5 in place a pin 10 is inserted in an axial opening therein. Rotatably carried by the pin 10 is an annular body 11 having an outwardly directed annular flange 12 on its free end. Secured to the inner shell 5 are a plurality of brackets 13 upon which are pivotally mounted bolts 14. The inner ends of the bolts 14 are connected as at 15 to the flange 12 and adjacent the outer end of each bolt there is provided a slot 16 in the annular rims 2 and 6, the hole 15' through which pivot 15 extends being of sufficient size to provide a loose connection effect sufficient to compensate for the difference in arcuate travel of pin 15 considered with respect to the movements of the two parts which the pin connects.

Figure 3:
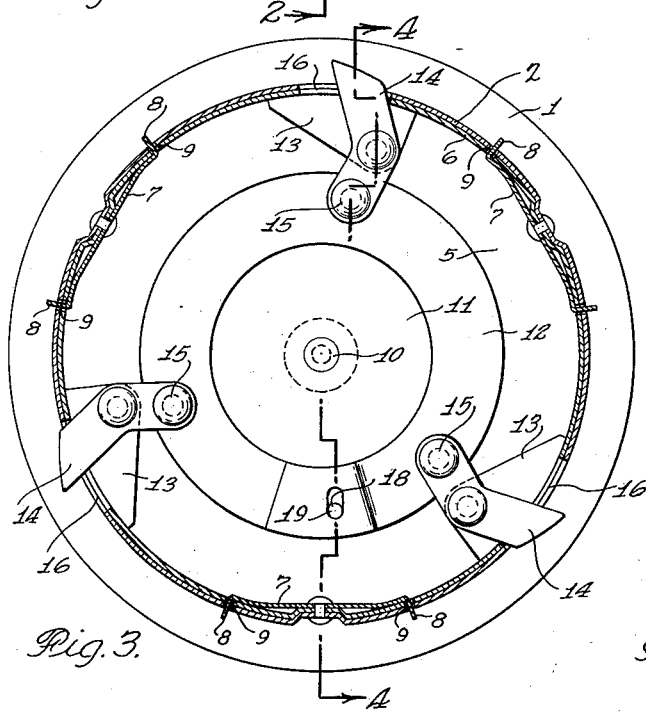
Fig. 3 is a cross section taken along the line 3—3 of Fig. 4.
Figure 4:
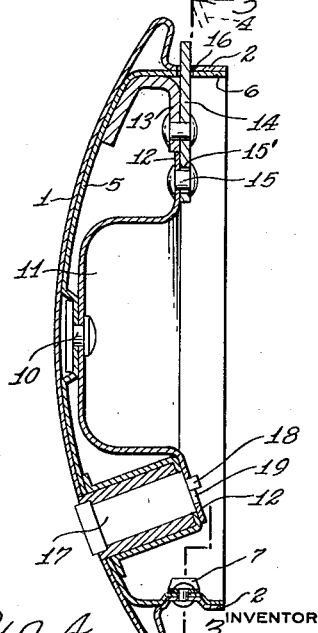
Fig. 4 is a cross section taken along the line 4—4 of Fig. 3.

Mounted in the shells 1 and 5 is a key actuated locking mechanism 17 of standard construction, it being designed so that upon insertion of a proper key the pin 18 may be moved from the position illustrated in Fig. 1 to that in Fig. 3. The pin 18 extends into a slot 19 in the flange 12.

Figure 2:
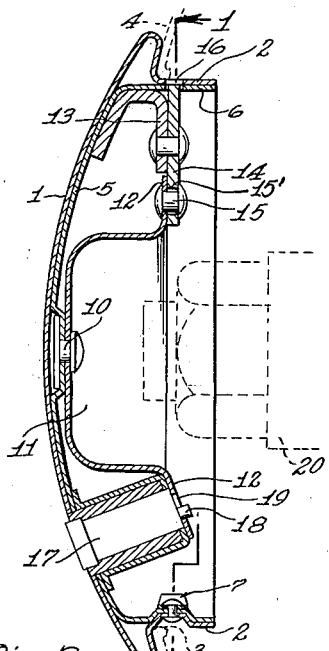
Fig. 2 is a cross section taken along the line 2—2 of Fig. 1.

With reference to Figs. 1 and 2 the parts may be seen in their unlocked position. As shown in Fig. 2 the hub cap rim 2 is received within the opening 3 in the hub 4 and the usual axle spindle shown in dotted lines at 20 is illustrated as extending into the annular body 11. Thus the lock mechanism does not interfere with the axle spindle in a manner to prevent the hub cap from being installed into the hub. With the parts positioned as above, let it be assumed that a key is inserted in the lock mechanism 17 and that the pin 18 is moved from the position shown in Fig. 1 to that shown in Fig. 3. The engagement of the pin 18 with the flange 12 causes the annular body 11 to be rotated incident to such movement of the pin. Rotary movement of the member 11 causes pivotal movement of the bolts 14 so that the outer ends of the bolts are projected through the slots 16. When the bolts 14 are projected as illustrated in Figs. 2 and 3 they engage the inner wall of the hub 4 and positively prevent removal of the hub cap from the hub.

Although a specific embodiment of the present invention has been illustrated and described it is to be understood that various changes may be made within the scope of the appended claim without departing from the spirit of the invention, and such changes are contemplated.

What I claim is:—

In a hub cap having a rim portion adapted to be inserted into the hub of a wheel, said rim portion being provided with a plurality of circumferentially spaced apart slots, brackets secured within said rim portion with a bracket located adjacent to each slot, bolts pivotally mounted upon said brackets whereby upon pivotal movement thereof they are projected through or retracted from said slots, said bolts being adapted to engage said rim portion when projected to prevent removal of said rim portion from said hub, and an element rotatably mounted in said cap and connected to said bolts whereby rotation thereof in opposite directions causes said bolts to pivot in opposite directions.

ALFRED HERSCH.